(12) United States Patent
Parks et al.

(10) Patent No.: US 12,530,043 B2
(45) Date of Patent: *Jan. 20, 2026

(54) REGION-BASED ELECTRICAL INTELLIGENCE SYSTEM

(71) Applicant: Sapient Industries, Inc., Philadelphia, PA (US)

(72) Inventors: Samuel M. Parks, Philadelphia, PA (US); Martin Koch, Philadelphia, PA (US)

(73) Assignee: Sapient Industries, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,543

(22) Filed: Oct. 5, 2023

(65) Prior Publication Data

US 2024/0111322 A1 Apr. 4, 2024

Related U.S. Application Data

(63) Continuation of application No. 17/393,073, filed on Aug. 3, 2021, now Pat. No. 11,815,929, which is a
(Continued)

(51) Int. Cl.
*G05F 1/66* (2006.01)
*G06F 1/3209* (2019.01)
(Continued)

(52) U.S. Cl.
CPC ............. *G05F 1/66* (2013.01); *G06F 1/3209* (2013.01); *G06F 1/3231* (2013.01);
(Continued)

(58) Field of Classification Search
CPC ............... H02J 13/0005; H02J 2310/12; H02J 2310/14; H02J 2310/56; H02J 3/14; G06F 1/3234; G05F 1/66
See application file for complete search history.

(56) References Cited

U.S. PATENT DOCUMENTS

| 5,486,725 A | 1/1996 | Keizer et al. |
| 5,592,032 A | 1/1997 | Keizer et al. |
| (Continued) | | |

FOREIGN PATENT DOCUMENTS

| CA | 2749628 A1 | 2/2012 |
| CN | 108736206 A | 11/2018 |
| (Continued) | | |

OTHER PUBLICATIONS

International Search Report in corresponding International Patent Application PCT/US2020/015149, dated Apr. 23, 2020, 8 pgs.
(Continued)

*Primary Examiner* — Vincent H Tran
(74) *Attorney, Agent, or Firm* — Young Basile Hanlon & MacFarlane, P.C.

(57) ABSTRACT

In some implementations, a system may include a server equipped with a web application, where the web application is configured to detect a relocation of a network-enabled electric plug of network-enabled electric plugs from a first region to a second region based on changes in data communication patterns; the network-enabled electric plugs, each plug configured to deliver electricity from an electrical source to a powered device and capable of communicating with the server; and an access point intermediary facilitating communication between the network-enabled electric plugs and the server.

20 Claims, 9 Drawing Sheets

Related U.S. Application Data continuation of application No. 16/263,724, filed on Jan. 31, 2019, now Pat. No. 11,106,263.

(51) Int. Cl.

| | | |
|---|---|---|
| *G06F 1/3231* | (2019.01) | |
| *G06F 1/3234* | (2019.01) | |
| *G06N 20/00* | (2019.01) | |
| *H02J 3/14* | (2006.01) | |
| *H02J 13/00* | (2006.01) | |
| *G06Q 50/06* | (2012.01) | |

(52) U.S. Cl.
CPC .......... *G06F 1/3234* (2013.01); *G06N 20/00* (2019.01); *H02J 3/14* (2013.01); *H02J 13/0005* (2020.01); *G06Q 50/06* (2013.01); *H02J 2310/14* (2020.01)

(56) References Cited

U.S. PATENT DOCUMENTS

| | | | |
|---|---|---|---|
| 5,734,206 A | 3/1998 | Keizer et al. | |
| 7,964,989 B1 | 6/2011 | Puschnigg et al. | |
| 8,154,999 B2 | 4/2012 | Tsuge et al. | |
| 9,007,186 B1 | 4/2015 | Krummey et al. | |
| 9,331,524 B1 | 5/2016 | Yetter | |
| 9,477,299 B2 | 10/2016 | Thompson | |
| 9,484,695 B2 | 11/2016 | Puschnigg et al. | |
| 9,705,330 B1 | 7/2017 | Yetter | |
| 9,760,140 B1 | 9/2017 | Krummey et al. | |
| 9,859,655 B2 | 1/2018 | Puschnigg et al. | |
| 10,042,342 B1 | 8/2018 | Tyrrell et al. | |
| 10,698,469 B2 | 6/2020 | Chapel et al. | |
| 11,106,263 B2* | 8/2021 | Parks .................... | G06F 1/3209 |
| 2007/0271383 A1 | 11/2007 | Kim et al. | |
| 2007/0297362 A1 | 12/2007 | Kimura et al. | |
| 2008/0200143 A1 | 8/2008 | Qiu et al. | |
| 2009/0102617 A1* | 4/2009 | Thommes .............. | G05B 15/02 |
| | | | 340/12.3 |
| 2009/0219145 A1* | 9/2009 | Wong .................... | H04L 67/52 |
| | | | 340/286.02 |
| 2010/0088762 A1 | 4/2010 | Hlavac et al. | |
| 2010/0100253 A1* | 4/2010 | Fausak .................. | G01D 4/002 |
| | | | 700/295 |
| 2010/0233991 A1 | 9/2010 | Crawford et al. | |
| 2010/0241284 A1* | 9/2010 | Maeda .................. | G01R 21/133 |
| | | | 700/295 |
| 2010/0250440 A1 | 9/2010 | Wang et al. | |
| 2010/0305773 A1 | 12/2010 | Cohen | |
| 2011/0063126 A1 | 3/2011 | Kennedy et al. | |
| 2012/0173177 A1 | 7/2012 | Nishiyama et al. | |
| 2012/0243466 A1 | 9/2012 | Hagens et al. | |
| 2012/0253881 A1* | 10/2012 | Schneider .............. | G06Q 10/06 |
| | | | 700/286 |
| 2012/0306661 A1 | 12/2012 | Xue et al. | |
| 2013/0031384 A1* | 1/2013 | Yamamoto ............. | G06F 1/28 |
| | | | 713/300 |
| 2013/0103330 A1 | 4/2013 | Cox et al. | |
| 2013/0262197 A1* | 10/2013 | Kaulgud ................ | G05B 13/02 |
| | | | 705/14.1 |
| 2013/0338844 A1 | 12/2013 | Chan et al. | |
| 2014/0088780 A1 | 3/2014 | Chen | |
| 2014/0089547 A1* | 3/2014 | Fyke ...................... | H04W 4/18 |
| | | | 370/328 |
| 2014/0136008 A1 | 5/2014 | Williams | |
| 2014/0379156 A1 | 12/2014 | Kamel et al. | |
| 2015/0088331 A1 | 3/2015 | Fiedler et al. | |
| 2015/0205316 A1* | 7/2015 | Choi ...................... | G05B 15/02 |
| | | | 700/295 |
| 2015/0236449 A1 | 8/2015 | Puschnigg et al. | |
| 2015/0241895 A1 | 8/2015 | Lu et al. | |
| 2015/0264776 A1 | 9/2015 | Amarin et al. | |
| 2016/0116933 A1 | 4/2016 | Craig et al. | |
| 2016/0127874 A1* | 5/2016 | Kingsmill ............... | H04W 4/30 |
| | | | 455/456.1 |
| 2016/0195864 A1* | 7/2016 | Kim ..................... | H04L 41/0886 |
| | | | 709/221 |
| 2016/0218509 A1 | 7/2016 | Paul et al. | |
| 2016/0360594 A1 | 12/2016 | Chemel | |
| 2016/0372868 A1 | 12/2016 | Puschnigg et al. | |
| 2017/0005923 A1 | 1/2017 | Babakian | |
| 2017/0010661 A1 | 1/2017 | Yang | |
| 2017/0025842 A1* | 1/2017 | Peterson ................. | H02H 1/04 |
| 2017/0070090 A1 | 3/2017 | Miller | |
| 2017/0192483 A1 | 7/2017 | Boss et al. | |
| 2017/0223798 A1 | 8/2017 | Shah et al. | |
| 2017/0256941 A1* | 9/2017 | Bowers ................. | G05B 13/041 |
| 2017/0351288 A1 | 12/2017 | Li et al. | |
| 2017/0372244 A1 | 12/2017 | Westergaard | |
| 2018/0004268 A1 | 1/2018 | Narita | |
| 2018/0077778 A1 | 3/2018 | Vangeel et al. | |
| 2018/0144255 A1* | 5/2018 | Shams ................... | G10L 25/66 |
| 2018/0196490 A1 | 7/2018 | Ail et al. | |
| 2018/0212791 A1 | 7/2018 | Garg et al. | |
| 2018/0253644 A1* | 9/2018 | Tan ...................... | G05B 13/0265 |
| 2018/0262046 A1 | 9/2018 | Moon et al. | |
| 2018/0294647 A1* | 10/2018 | Borean .................. | H04L 67/125 |
| 2019/0025355 A1 | 1/2019 | Decamp et al. | |
| 2019/0027963 A1* | 1/2019 | Parks .................... | H02J 13/00026 |
| 2019/0087845 A1 | 3/2019 | Kohli | |
| 2019/0327851 A1 | 10/2019 | Schmidt et al. | |
| 2020/0145495 A1* | 5/2020 | Coffey ................... | H04L 67/125 |
| 2021/0204095 A1* | 7/2021 | Luomi ................... | G01S 5/0284 |

FOREIGN PATENT DOCUMENTS

| | | |
|---|---|---|
| WO | 2015147455 A1 | 10/2015 |
| WO | 2015155250 A1 | 10/2015 |

OTHER PUBLICATIONS

Extended European Search Report mailed on Sep. 19, 2022 in corresponding European Patent Application No. 20748956.8.

\* cited by examiner

REGION-BASED ELECTRICAL INTELLIGENCE SYSTEM

CROSS REFERENCES TO RELATED APPLICATIONS

This application is a continuation of U.S. patent application Ser. No. 17/393,073, filed Aug. 3, 2021, which is a continuation of U.S. patent application Ser. No. 16/263,724, filed Jan. 31, 2019, the entire disclosures of which are incorporated herein by reference.

TECHNICAL FIELD

This disclosure relates to a region-based electrical intelligence system, in particular, to a system for intelligently monitoring and controlling electrical usage based on regional deployments of network-enabled electric plugs.

BACKGROUND

Buildings may include large numbers of devices powered by electricity. Many buildings include meters for measuring electrical usage by those devices. In many cases, however, those devices are receiving electricity even when not in use, resulting in potentially considerable electrical waste.

SUMMARY

Disclosed herein are, inter alia, implementations of systems and techniques for region-based electrical intelligence. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a system may include a server equipped with a web application, where the web application is configured to detect a relocation of a network-enabled electric plug of network-enabled electric plugs from a first region to a second region based on changes in data communication patterns; the network-enabled electric plugs, each plug configured to deliver electricity from an electrical source to a powered device and capable of communicating with the server; and an access point intermediary facilitating communication between the network-enabled electric plugs and the server.

In one general aspect, a method may include connecting a network-enabled electric plug to a web application for authorization; initiating a sniffing process during an authorization process to identify other network-enabled electric plugs connected to a common access point and obtaining identifiers for each identified network-enabled electric plug; identifying a relocation of the network-enabled electric plug from a first region to a second regions based on a mismatch between newly obtained identifiers during the sniffing process and a previously known list of identifiers; transmitting a message to the web application to indicate the relocation; and receiving, from the web application, configurations governing the network-enabled electric plug that optimize electrical usage in the second region.

In one general aspect, a network-enabled electric plug may include a processor that is configured to connect the network-enabled electric plug to a web application for authorization; initiate a sniffing process during an authorization process to identify other network-enabled electric plugs connected to a common access point and obtaining Internet Protocol (IP) addresses for each identified network-enabled electric plug; identify a relocation of the network-enabled electric plug from a first region to a second regions based on a mismatch between newly obtained IP addresses during the sniffing process and a previously known list of IP addresses; and receive, from the web application, configurations governing the network-enabled electric plug that optimize electrical usage in the second region.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
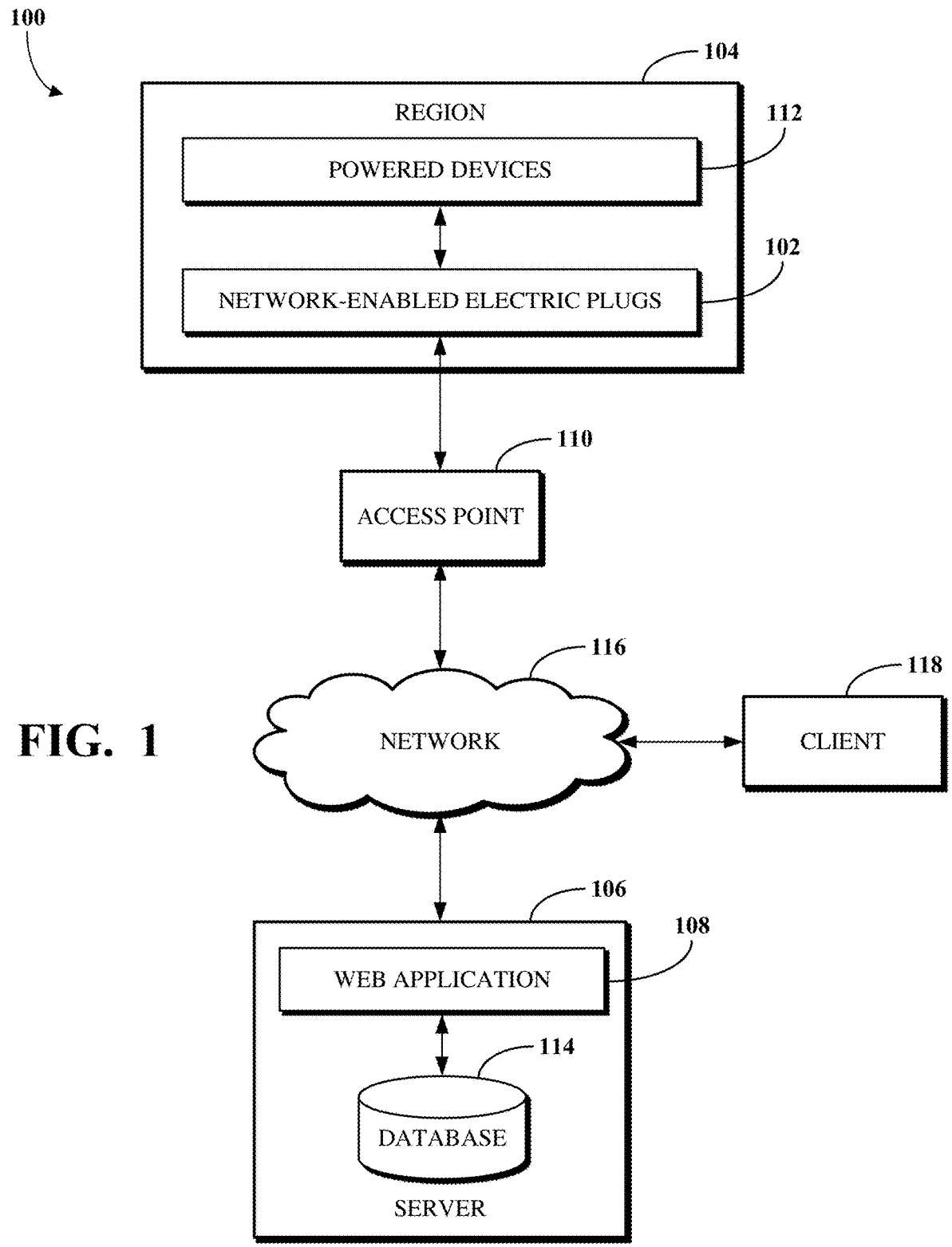
FIG. 1 is a block diagram showing an example of a region-based electrical intelligence system.

Electrical usage monitoring has long been used to monitor the electrical use across an electric grid. For example, a building may have a metered circuit, which monitors a total amount of electricity used by the various devices connected to the circuit within the building. However, the portions of a building for which electricity is supplied using the metered circuit are not configurable. As such, once the metered circuit is installed, it is difficult and generally impractical to reconfigure. Some conventional techniques for electrical usage monitoring may also include monitoring electrical usage for individual devices. Determining collective electrical usage by multiple devices requires manually collecting and combining the electrical usage for each of the individual devices.

However, conventional techniques for electrical usage monitoring suffer from several drawbacks. In particular, conventional techniques for electrical usage monitoring fail to consider electrical usage within regions, rather than for individual devices or for an entire building or metered circuit. The monitoring of electrical usage for regions, that is, for defined areas including devices that receive electricity, is a considerably more useful metric for measuring electrical usage. This is mainly because there may be considerable electrical waste in a building, but a metered circuit or a collection of individual device sensors cannot indicate where the waste derives within the building.

Furthermore, conventional techniques for electrical usage monitoring do not include functionality for selectively controlling the delivery of electricity to devices in regions based on region-based analyses of electrical usage. That is, it would be highly desirable to understand how electrical waste occurs in specific regions. For example, that knowledge could be used to design rules for reducing or preventing the electrical waste, such as by limiting the delivery of electricity to devices within those regions.

Implementations of this disclosure address problems such as these using a region-based electrical intelligence system for configuring and controlling electrical usage within regions, rather than for individual powered devices or for an entire electrical grid. A region-based electrical intelligence system is used to configure and control electrical usage within regions, for example, within certain areas of a floor of a building or within certain floors of a building. A number of network-enabled electric plugs are deployed in a region. Each of the network-enabled electric plugs is configured to deliver electricity from an electricity source to one or more powered devices located in the region. A server runs a web application used to monitor electrical usage information for the region based on electrical usage by each of the one or more powered devices. The web application generates rules for selectively controlling the delivery of electricity from the network-enabled electric plugs to the powered devices based on the monitored electrical usage information.

To describe some implementations in greater detail, reference is first made to examples of hardware and software structures used to implement a region-based electrical intelligence system. FIG. 1 is a block diagram showing an example of a region-based electrical intelligence system 100. The region-based electrical intelligence system 100 includes a number of network-enabled electric plugs 102 located within a region 104, a server 106 that runs a web application 108, and an access point 110 intermediary to the region network-enabled electric plugs 102 and the web application 108.

The network-enabled electric plugs 102 are electric plugs used to deliver electricity from electrical sources to powered devices 112 located in the region 104. An input of a network-enabled electric plug 102 can be connected to an electrical source and a powered device 112 can be connected to an output of the network-enabled electric plug 102. For example, the input of a network-enabled electric plug 102 can be or include a number of plug blades (e.g., according to geographic electric plug standards), and the output of the network-enabled electric plug 102 can be or include a socket. The plug blades of the network-enabled electric plug 102 can be connected into a socket of an electrical source and the plug blades of a powered device 112 can be connected to the socket of the network-enabled electric plug 102.

An electrical source refers to a source of electricity that may be delivered to the powered device 112, such as with or without using the network-enabled electric plugs 102. As such, an electrical source may, for example, include an electrical output (e.g., a wall outlet or other outlet to which an electrical device may conventionally be plugged into) or another source of electricity.

A powered device 112 refers to a device, component, element, machine, or other thing which receives electrical power. Examples of powered devices 112 include, but are not limited to, computers (e.g., desktops, laptops, tablets, game consoles, etc.), computer-related devices (e.g., routers, modems, network switches, speakers, monitors, etc.), kitchen appliances (e.g., refrigerators, microwaves, stoves, ovens, etc.), lighting units (e.g., desktop lamps, floor lamps, etc.), temperature control machines (e.g., furnaces, air conditioners, fans, etc.), and communication devices (e.g., desktop phones, cell phones, etc.).

There may be one or more network-enabled electric plugs 102 located in the region 104 at a given time. As such, there may also be one or more powered devices 112, and, further, one or more electrical sources, in the region 104 at a given time.

The server 106 is a computing aspect that runs the web application 108. The server 106 may be or include a hardware server (e.g., a server device), a software server (e.g., a web server and/or a virtual server), or both. For example, where the server 106 is or includes a hardware server, the server 106 may be a server device located in a rack, such as of a data center.

The web application 108 is application software used to configure, monitor, and control the operation of the network-enabled electric plugs 102. For example, the web application 108 can be used to deploy the network-enabled electric plugs 102 within the region 104, such as to configure the network-enabled electric plugs 102 for use in delivering electricity to the powered devices 112 and to configure the network-enabled electric plugs 102 to report electrical usage by the powered devices 112. In another example, the web application 108 can be used to monitor the electrical usage of the powered devices 112, such as based on the amount of electricity delivered to the powered devices 112 by the network-enabled electric plugs 102 and/or based on the times at which the network-enabled electric plugs 102 deliver electricity to the powered devices 112.

In yet another example, the web application 108 can be used to selectively control the operation of the network-enabled electric plugs 102, such as based on the monitored electrical usage by the powered devices 112. For example, the web application 108 can be used to selectively control the operation of the network-enabled electric plugs 102 by limiting times at which the network-enabled electric plugs 102 can deliver electricity to the powered devices 112 and/or limiting loads of electricity which may be delivered by the network-enabled electric plugs to the powered devices 112. For example, the web application 108 can generate rules, which can be asserted for selectively controlling the operation of the network-enabled electric plugs 102.

The web application 108 accesses a database 114 on the server 106 to perform at least some of the functionality of the web application 108. The database 114 is a database or other data store used to store, manage, or otherwise provide data used to deliver functionality of the web application 108. For example, the database 114 may be a relational database management system, an object database, an XML database, a configuration management database, a management information base, one or more flat files, other suitable non-transient storage mechanisms, or a combination thereof.

The access point 110 is a computing aspect used to communicate information and/or commands between the network-enabled electric plugs 102 and the web application 108. The access point 110 may be or include network hardware, such as a router, a switch, a load balancer, another network device, or a combination thereof. The access point 110 may receive information and/or commands from and/or transmit information and/or commands to the network-enabled electric plugs 102 using one or more network protocols, such as using Ethernet, TCP, IP, power line communication, Wi-Fi, Bluetooth®, infrared, GPRS, GSM, CDMA, Z-Wave, ZigBee, another protocol, or a combination thereof.

The access point 110 communicates with the web application 108 over a network 116. The network 116 may, for example, be a local area network, a wide area network, a machine-to-machine network, a virtual private network, or another public or private network.

A client 118 may be given access to the web application 108. For example, the client 118 be a mobile device, such as a smart phone, tablet, laptop, or the like. In another example, the client 118 may be a desktop computer or another non-mobile computer. The client 118 may run a software application (e.g., client-side application software) to communicate with the web application 108. For example, the software application may be a mobile application that enables access to some or all functionality and/or data of the web application 108. The client 118 communicates with the server 106 over the network 116.

Implementations of the region-based electrical intelligence system 100 may differ from what is shown and described with respect to FIG. 1. In some implementations, the access point 110 may be omitted. For example, the network-enabled electric plugs 102 may be configured to communicate with the web application 108 over the network 116 using a long range, low power system or another communication mechanism. In some implementations, the access point 110 may be located in the region 104. In some implementations, the access point 110 may include or otherwise use a firewall, for example, to prevent listening or data access to communicated information by other than the network-enabled electric plugs 102 or the web application 108.

In some implementations, such as where the web application 108 is used to control and monitor electrical usage for powered devices in multiple regions, the access point 110 may communicate information between the web application 108 and network-enabled electric plugs located in multiple regions. For example, where multiple regions are defined as different areas of a floor of a building, the access point 110 may be centrally or otherwise positioned to operate with the network-enabled electric plugs in each of those areas. The different areas are typically non-overlapping in that the deployment of each network-enabled electric plug is limited to a single region. However, in some cases, the different areas may overlap, such as where one or more of the powered devices is shared between two or more of those regions.

Figure 2:
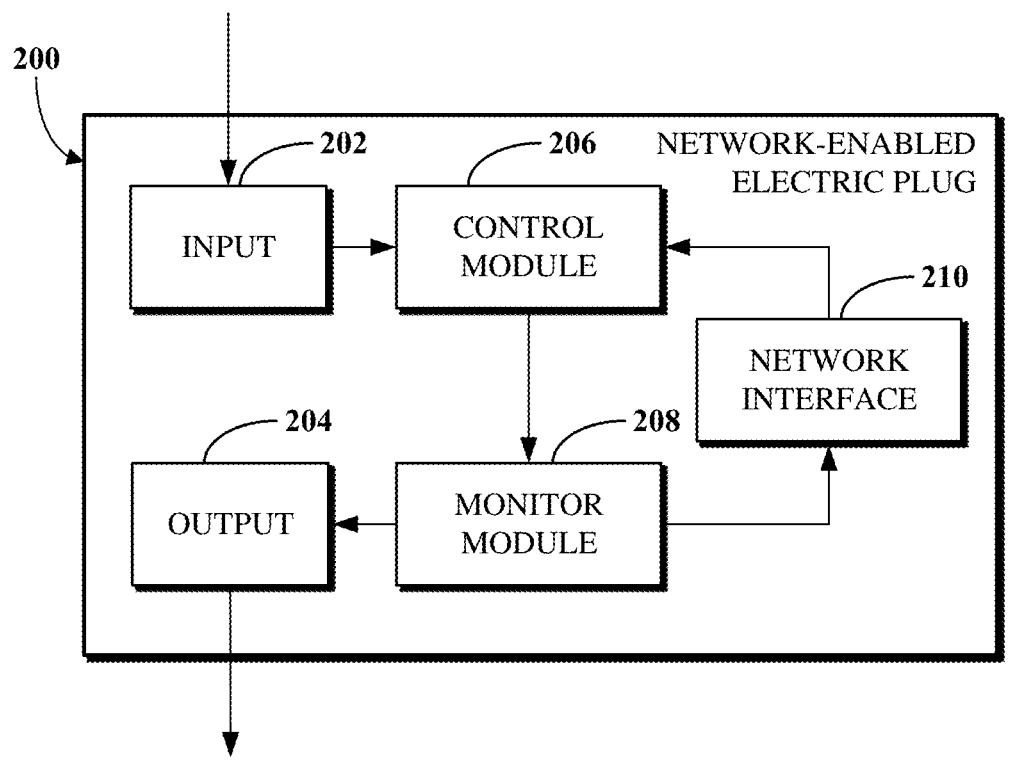
FIG. 2 is a block diagram showing an example of a network-enabled electric plug.

FIG. 2 is a block diagram showing an example of a network-enabled electric plug 200. The network-enabled electric plug 200 may, for example, be one of the network-enabled electric plugs 102 shown in FIG. 1. The network-enabled electric plug 200 includes an input 202, an output 204, a control module 206, a monitor module 208, and a network interface 210.

The input 202 receives electricity, such as from an electrical source. The output 204 delivers electricity, such as to a powered device (e.g., one of the powered devices 112 shown in FIG. 1). The input 202 may be a hardware component, for example, one or more blades which may be inserted into a socket of an electrical source. Alternatively, the input 202 may be a software component, such as instructions for directing electricity from the electrical source to the control module 206. As a further alternative, the input 202 may include a hardware component and a software component.

Similarly, the output 204 may be a hardware component, for example, a socket which may receive one or more blades of a powered device. Alternatively, the output 204 may be a software component, such as instructions for directing electricity to the powered device from the control module 206. As a further alternative, the output 204 may include a hardware component and a software component.

The control module 206 can control the delivery of electricity from the network-enabled electric plug 200, such as via the output 204. For example, the network-enabled electric plug 200 can be configured to limit deliver electricity to a connected powered device, such as based on time of day, amount of electricity drawn via the input 202, both, or other bases. Configuring the network-enabled electric plug 200 to limit delivery of electricity to a connected powered device can include asserting rules for electricity delivery against the network-enabled electric plug 200.

The control module 206 can maintain and/or use a list of asserted rules to determine whether to allow delivery of electricity from the input 202 through to the output 204. For example, the network-enabled electric plug 200 may be included in a system for region-based electrical intelligence (e.g., the region-based electrical intelligence system 100 shown in FIG. 1). The system for region-based electrical intelligence may further include a web application (e.g., the web application 108 shown in FIG. 1).

The web application may include functionality for generating rules used to selectively control the delivery of electricity from the input 202 through to the output 204, for example, based on electrical usage of a powered source that receives electricity from the output 204 of the network-enabled electric plug 200. The electrical usage of the powered source can be monitored, for example, using the monitor module 208. Thus, the electrical usage of the powered device can refer to the electricity delivered to the powered device via the output 204.

The monitor module 208 includes or otherwise uses a hardware component and/or a software component to monitor electricity delivered from the input 202 through to the output 204. For example, the monitor module 208 can include or otherwise use a power meter with one or more sensors to measure electricity delivered from the input 202 through to the output 204. In another example, the monitor module 208 can include or otherwise use a clock to monitor times at which electricity is delivered from the input 202 through to the output 204. The clock may be internal to the network-enabled electric plug 200. Alternatively, the clock may be external to the network-enabled electric plug 200, such as where the network-enabled electric plug 200 uses time information from a server or another device.

The control module 206 can include or otherwise use a hardware component and/or a software component to selectively allow delivery of electricity from the input 202 through to the output 204. For example, a hardware component included in or otherwise used by the control module 206 can be or include a conductor used to selectively open and close a circuit for delivering the electricity from the input 202 through to the output 204. In another example, a software component included in or otherwise used by the control module 206 can include instructions, such as programmed into an integrated circuit, for selectively opening and closing a circuit for delivering the electricity from the input 202 through to the output 204. The physical chip of the integrated circuit may, in at least some cases, be considered a hardware component.

The network interface 210 is used to transmit information and/or commands to and/or receive information and/or commands from one or more devices external to the network-enabled electric plug 200. The network interface 210 provides a connection or link to a network (e.g., the network 116 shown in FIG. 1). The network interface 210 can be a wired network interface or a wireless network interface. The network-enabled electric plug 200 can communicate with other devices via the network interface 210 using one or more network protocols, such as using Ethernet, TCP, IP, power line communication, Wi-Fi, Bluetooth, infrared, GPRS, GSM, CDMA, Z-Wave, ZigBee, another protocol, or a combination thereof.

For example, the network interface 210 can be used to transmit information indicative of monitored electrical usage of a powered device connected to the network-enabled electric plug 200. The monitor module 208 can make the information indicative of monitored electrical usage of the powered device available to, for example, the web application of the system for region-based electrical intelligence using the network interface 210.

In another example, the network interface 210 can be used to receive commands to assert certain rules for selectively controlling the delivery of electricity from the input 202 through to the output 404. For example, the commands can include the rules themselves, information indicative of the rules, and/or other information related to the rules. The commands can be received using the network interface 210 and then made available to the control module 206. The control module 206 can then be configured to selectively control delivery of the electricity from the input 202 based on the commands. For example, configuring the control module 206 to selectively control delivery of the electricity from the input 202 can include the control module 206 adding the rule or rules from such a command to a list of the asserted rules.

Implementations of the network-enabled electric plug 200 may differ from what is shown and described with respect to FIG. 2. In some implementations, the control module 206 and the monitor module 208 may both be included in a single combined module. For example, the combined module may both receive the input 202 and enable the output 204. In such an implementation, the combined module may also perform all data communication using the network interface 210.

In some implementations, the network-enabled electric plug 200 may include multiple outputs. For example, the output 204 may be a first output, and the network-enabled electric plug 200 may include one or more other outputs. Each output may support direct delivery of electricity to a single powered device (e.g., where the powered device is directly plugged into the output 204). As such, in such an implementation, the network-enabled electric plug 200 may enable simultaneous direct delivery of electricity to N powered devices, where N is the number of outputs of the network-enabled electric plug 200.

In some implementations, the network-enabled electric plug 200 may include a physical interface element which may be toggled or otherwise interacted with by a user. For example, the physical interface element may be a button, a switch, or another hardware element. The physical interface element may be configured to cause one or more functions to be performed based on the manner in which the physical interface element is toggled or otherwise interacted with.

For example, when the physical interface element is toggled or otherwise interacted with one time (e.g., a single push, where the physical interface element is a button), the physical interface element may cause the control module 206 to use the network interface 210 to check for updates to the rules for controlling electricity delivery via the output 204, but which may not have been pushed to the control module 206 yet.

In another example, when the physical interface element is toggled or otherwise interacted with multiple times (e.g., a double or triple push), the physical interface element may cause the control module 206 to override currently configured rules that control the electricity delivery via the output 204, such as to enable an unimpeded flow of electricity from the input 202 to the output 204 for some amount of time.

In some such implementations, the amount of time for which the flow of electricity from the input 202 to the output 204 is unimpeded based on a toggling or other interaction with a physical interface element may be unlimited, ended by user action (e.g., re-engaging the configured rules using a web application, such as the web application 108 shown in FIG. 1), or limited to a particular amount of time (e.g., 5 minutes, 10 minutes, 1 hour, or some other amount of time).

The particular action performed by a given manner of toggling or other interaction with the physical interface element may be set by default, for example, by a manufacturer of the network-enabled electric plug 200. Alternatively, a user may be able to configure the particular action performed by a given manner of toggling or other interaction with the physical interface element, for example, using a web application (e.g., the web application 108).

In some implementations, the network-enabled electric plug 200 may include multiple such physical interface elements. For example, each of the multiple physical interface elements may be configured to cause a different action to be performed. In some such implementations, the various physical interface elements may be implemented as the same or as different types of hardware elements.

Figure 3:
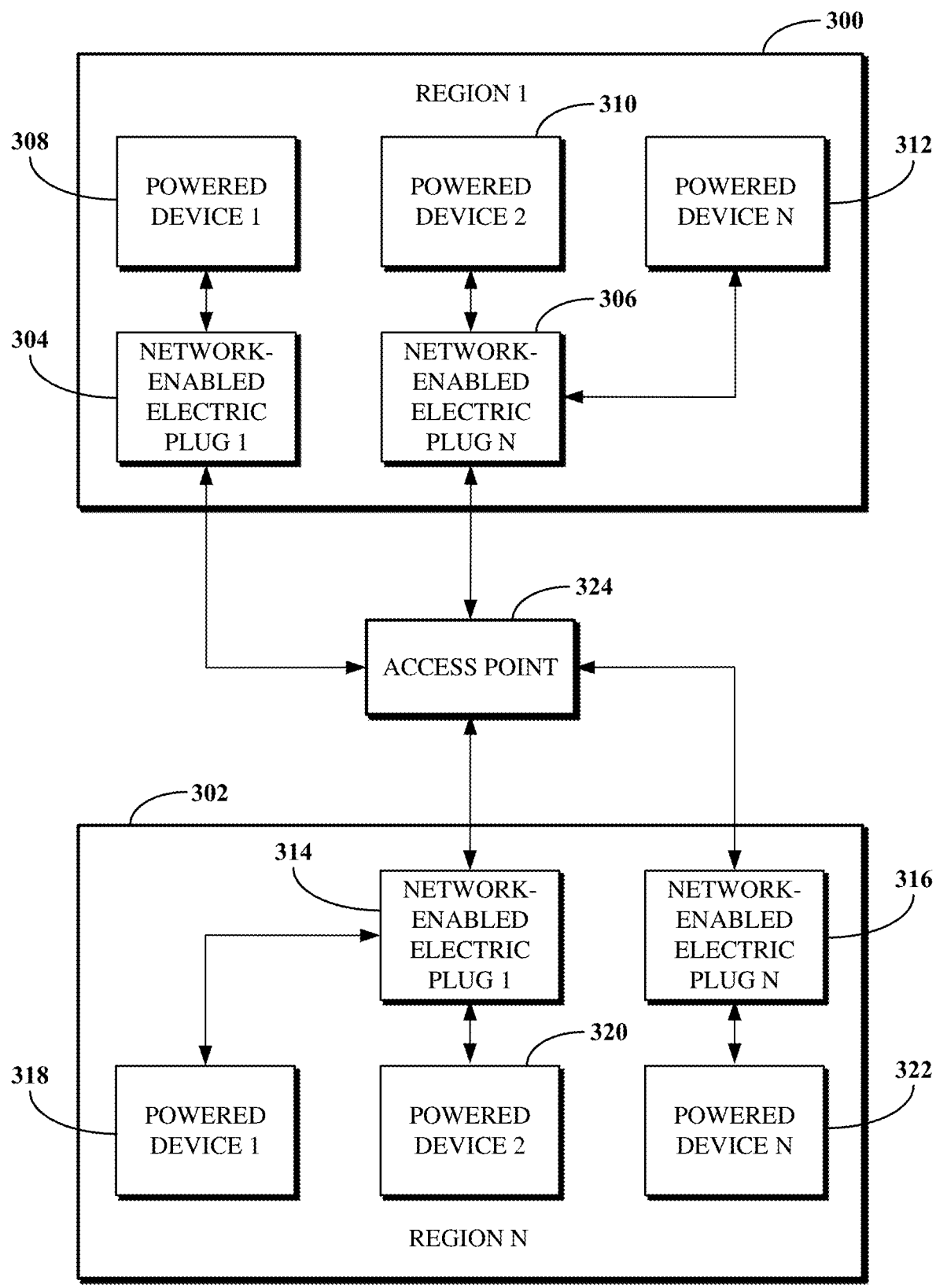
FIG. 3 is a block diagram showing examples of regions in which network-enabled electric plugs may be deployed.

FIG. 3 is a block diagram showing examples of regions in which network-enabled electric plugs may be deployed. In particular, FIG. 3 shows a first region, region 1 300, and an Nth region, region N 302. Region 1 300 and region N 302 are two of N regions configured for a region-based electrical intelligence system, such as the region-based electrical intelligence system 100 shown in FIG. 1. Each of region 1 300 or region N 302 may, for example, be the region 104 shown in FIG. 1.

Each of region 1 300 and region N 302 include a number of network-enabled electric plugs and a number of powered devices, which may, for example, respectively be the network-enabled electric plugs 102 and the powered devices 112 shown in FIG. 1. In the examples shown, region 1 300 includes a first network-enabled electric plug, network-enabled electric plug 1 304, and an Nth network-enabled electric plug, network-enabled electric plug N 306. Region 1 300 also includes a first powered device, powered device 1 308, a second powered device, powered device 2 310, and an Nth powered device, powered device N 312. Network-enabled electric plug 1 304 delivers electricity to powered device 1 308, and network-enabled electric plug N 306 delivers electricity to powered device 2 310 and to powered device N 312.

Also in the examples, shown, region N 302 includes a first network-enabled electric plug, network-enabled electric plug 1 314, and an Nth network-enabled electric plug, network-enabled electric plug N 316. Region N 302 also includes a first powered device, powered device 1 318, a second powered device, powered device 2 320, and an Nth powered device, powered device N 322. Network-enabled electric plug 1 314 delivers electricity to powered device 1 318 and to powered device 2 320, and network-enabled electric plug N 316 delivers electricity to powered device N 322. As used throughout the examples shown in FIG. 3, N is an integer with a value of two or greater.

As shown, an access point 324 is accessible to both region 1 300 and region N 302. In this way, each network-enabled electric plug of both of region 1 300 and of region N 302 can communicate with the access point 324. For example, the access point 324 may be located central to the region 1 300 and to the region N 302. The access point 324 may, for example, be the access point 110 shown in FIG. 1. The access point 324 may be configured to communicate information and/or commands between some or all of the network-enabled electric plug of both of region 1 300 and of region N 302 and a web application, for example, the web application 108 shown in FIG. 1.

Implementations of the region 300 may differ from what is shown and described with respect to FIG. 3. In some implementations, a region (e.g., Region 1 300, Region N 302, or another region) may include only one network-enabled electric plug. For example, in region 1 300, the network enabled-electric plug N 306 may be omitted. In such a case, either the powered device 2 310 and the powered device N 312 may also be omitted, or the powered device 2 310 and the powered device N 312 may be configured to receive electricity using the network-enabled electric plug 1 304.

In some implementations, each of the region 1 300 and the region N 302 may include their own access points. For example, the access point 324 can be an access point of region 1 300, and a different access point can be an access point of region N 302. In some implementations, one or both of the region 1 300 or the region N 302 may include multiple access points. For example, multiple access points may be used in a single region where the region is large and a single access point may not have a strong connection to each of the network-enabled electric plugs deployed throughout that region.

Figure 4:
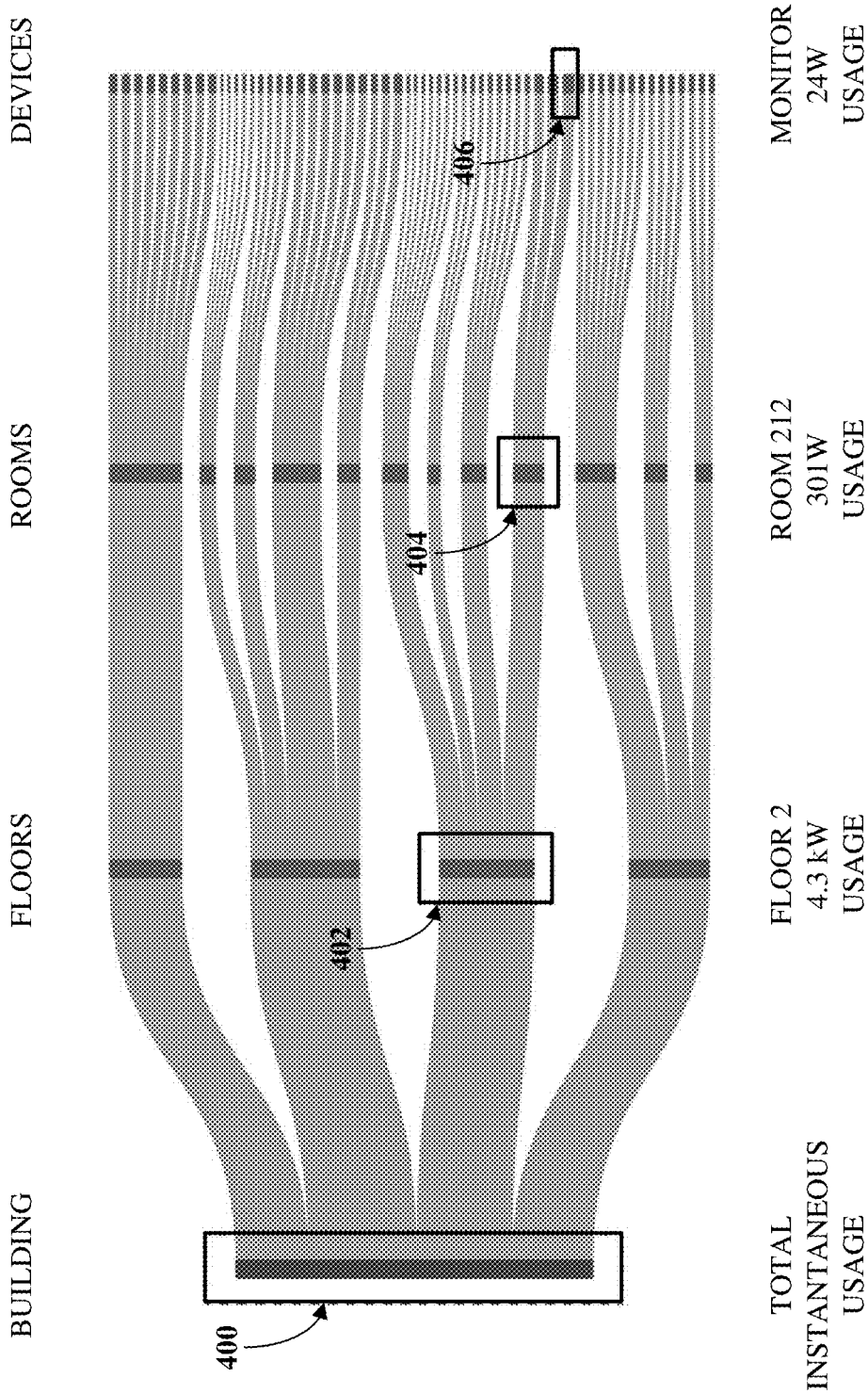
FIG. 4 is an illustration showing examples of electrical usage monitored using a region-based electrical intelligence system.

FIG. 4 is an illustration showing examples of electrical usage monitored using a region-based electrical intelligence system, for example, the region-based electrical intelligence system 100 shown in FIG. 1. In particular, the illustration shown in FIG. 4 is a hierarchical breakdown of electrical usage at which a first stage shows the total instantaneous electrical usage for an entire Building at 400. The Building includes four floors, with the floors being shown at a second stage of the hierarchical breakdown. In particular, Floor 2, shown at 402, is using 4.3 kilowatts of the total instantaneous electrical usage for the entire building.

Each of the four floors includes a number of rooms, with the rooms being shown at a third stage of the hierarchical breakdown. In particular, Floor 2 includes a room referred to as Room 212, shown at 404, which is using 310 watts of the 4.3 kilowatts used by Floor 2. Each of the rooms on each of the floors includes a number of devices (e.g., powered devices, such as the powered devices 112 shown in FIG. 1), with the devices being shown at a fourth stage of the hierarchical breakdown. In particular, one of the devices in Room 212 is a computer monitor, shown at 406, which is using 24 watts of the 310 watts used by Room 212.

The hierarchical breakdown of electrical usage shown in FIG. 4 depicts how a region-based electrical intelligence system (e.g., the region-based electrical intelligence system 100 shown in FIG. 1) can be used to configure, control, and monitor electrical usage for regions, rather than for an entire building or for individual devices. A region (e.g., the region 104 shown in FIG. 1) for which electrical usage is configured, controlled, and monitored may refer to one of the floors of the building, for example, Floor 2 shown at 402. Alternatively, a region may refer to one of the rooms of one of the floors, for example, Room 212 shown at 404.

However, a region for which electrical usage may be configured, controlled, and monitored according to this disclosure is not limited to a floor of a building or a room of a floor. That is, without limitation, other areas may represent regions for which electrical usage may be configured, controlled, and monitored according to this disclosure. For example, a region may include a portion of a room, multiple rooms, a portion or all of a suite, multiple suites, another portion of a floor of a building, multiple floors of a building, multiple portions of multiple floors of a building, and so on.

In some cases, a user of the region-based electrical intelligence system disclosed herein may define what the region is. For example, a web application of the region-based electrical intelligence system (e.g., the web application 108 shown in FIG. 1) may include functionality for a user to define a region for which electrical usage may be configured, controlled, and monitored, such as based on a location of the region within a building, a number of powered devices and/or network-enabled electric plugs (e.g., the powered devices 112 and/or the network-enabled electric plugs 102 shown in FIG. 1) within the region, and/or other bases.

Figure 5:
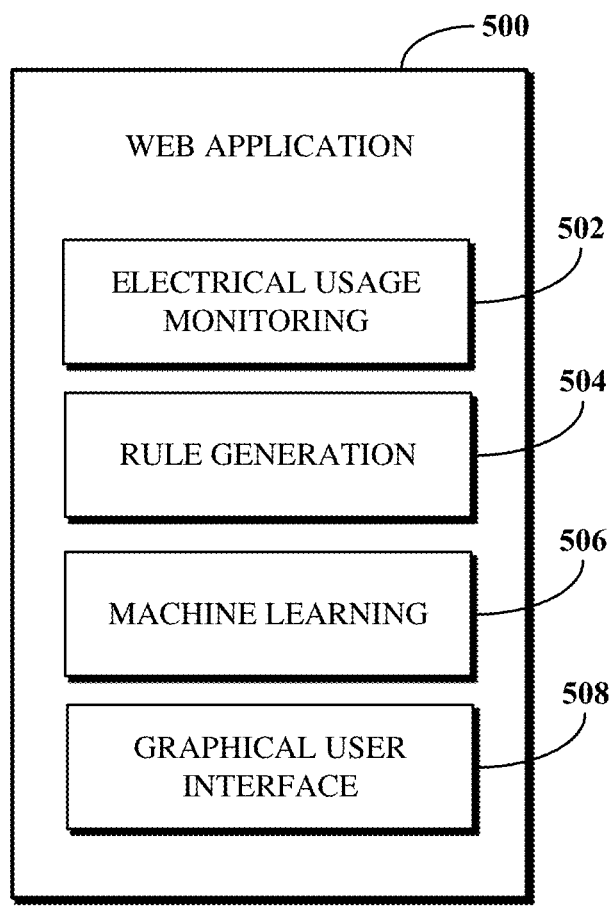
FIG. 5 is a block diagram showing examples of functionality of a web application of a region-based electrical intelligence system.

FIG. 5 is a block diagram showing examples of functionality of a web application 500 of a region-based electrical intelligence system. For example, the web application 500 may be the web application 108 of the region-based electrical intelligence system 100 shown in FIG. 1. The web application 500 include electrical usage monitoring functionality 502, rule generation functionality 504, machine learning functionality 506, and a GUI 508.

The electrical usage monitoring functionality 502 monitors electrical usage by powered devices connected to the network-enabled electric plugs associated with the web application 500. For example, the electrical usage monitoring functionality 502 can collect electrical usage information for the powered devices from the network-enabled electric plugs in a region. The electrical usage information can indicate amounts of electricity delivered to one or more powered devices connected to each of the network-enabled electric plugs.

The electrical usage monitoring functionality 502 can process the electrical usage information to determine usage patterns for the powered devices. For example, the electrical usage information for a powered device can indicate an activity cycle of the powered device. The activity cycle can be used to determine when and how the powered device receives electricity. As such, the activity cycle, and thus the usage patterns, can indicate when the powered devices receive electricity and how much electricity they receive at those times. Thus, whereas the collection of the electrical usage information is disaggregated, the usage patterns are determined based on aggregations of the disaggregated electrical usage information.

The electrical usage monitoring functionality 502 can further analyze the usage patterns for the powered devices to determine a predictive demand for those powered devices. For example, the predictive demand for a powered device can represent a forecast of electricity use by the powered device over some time period. The predictive demand for a powered device can represent actual electrical usage (e.g., as indicated in the collected electrical usage information for the powered device or by the usage patterns for the powered device) projected over that time period.

The electrical usage monitoring functionality 502 may include reporting functionality, such as for reporting electrical usage within one or more regions. For example, the reporting functionality can be used to generate electrical usage reports for certain regions, certain powered devices (e.g., based on types or categories of the powered devices), or for other purposes. The electrical usage reports can indicate electrical usage over a defined period of time. For example, the reporting functionality may generate a monthly electrical usage report. In some cases, the period of time for which electrical usage reports are generated may be configurable.

The reporting functionality may also or instead be used to maintain and/or generate reports of key performance indicators for the electrical usage within one or more regions. For example, the key performance indicators can represent measurements or goals for electrical usage, such as reductions in overall electrical usage for one or more specified regions during a recent time period as compared to the overall electrical usage for the one or more specified regions in an earlier time period. In some cases, the particular metrics used for the key performance indicators may be configurable. In some cases, the reporting functionality of the electrical usage monitoring functionality 502 may be disabled.

The rule generation functionality 504 includes functionality for generating rules used to selectively control the delivery of electricity by network-enabled electric plugs to powered devices. A rule may be generated by a user of the web application 500. Alternatively, a rule may be generated by the rule generation functionality 504 itself. The web application 500 may be used to assert a number of rules generated using the rule generation functionality 504, in which either all of the rules are generated by the user, all of the rules are generated by the rule generation functionality 504, or some of the rules are generated by the user and the others are generated by the rule generation functionality 504.

A user of the web application 500 may generate a rule with or without reference to information collected or reported using the electrical usage monitoring functionality 502. For example, a user of the web application 500 may review electrical usage information for a region to determine whether and how to design a new rule. For example, the electrical usage information may indicate that too much electricity is being delivered to powered devices while no one occupies a region, and that the powered devices include particular powered devices which are not in use when the region is not occupied. The user of the web application 500 may thus generate a rule which, when asserted against the one or more network-enabled electric plugs that deliver electricity to those particular powered devices, cause such electricity delivery to be limited when the region is not occupied.

In another example, the user of the web application 500 may want to preemptively or proactively limit electrical usage, such as where the user does not expect particular powered devices in a region to be used at certain times of the day and/or of the night. In such a case, the user may generate a rule which, when asserted against the one or more network-enabled electric plugs that deliver electricity to those particular powered devices, cause such electricity delivery to be limited during those certain times of day and/or night.

Separately, the rule generation functionality 504 may generate a rule based on the information collected or reported using the electrical usage monitoring functionality 502. For example, a rule can be generated based on usage patterns for the powered devices in a particular region, such as usage patterns determined using the electrical usage monitoring functionality 502 of the web application. In some cases, the machine learning functionality 506 can be used to analyze the information collected or reported using the electrical usage monitoring functionality 502. The machine learning functionality 506 can then use that analysis to design a rule to be generated using the rule generation functionality 504.

Regardless of the manner used, after a rule is generated by the rule generation functionality 504, that rule is made available for user review before it is asserted against one or more network-enabled electric plugs associated with the web application 500. For example, the web application 500 can generate a notification for the user indicating that a new rule is available for approval. The web application 500 can transmit the notification to a client device of the user (e.g., the client 118 shown in FIG. 1) and/or include the notification in the GUI 508. In another example, the web application 500 can be configured to notify a user of new rules available for approval at certain times, such as at the beginning of a work day, at the end of a work day, when a certain number of new rules for approval have been generated, or at other times. In some cases, the requirement for rules to be user-approved before being asserted may be disabled.

The machine learning functionality 506 includes intelligence for analyzing aspects of the web application 500 and/or of the information used in connection with the web application 500. The intelligence of the machine learning functionality 506 may use or otherwise refer to one or more of a neural network, a deep neural network, a support vector machine, a cluster network, a Bayesian network, or another machine learning approach.

The machine learning functionality 506 may be used in connection with other functionality of the web application 500 or be used independent of such other functionality. For example, the machine learning functionality 506 can be used to identify powered devices connected to network-enabled electric plugs associated with the web application 500. For example, the machine learning can include processing functionality performed against identity information for powered devices, which identity information can be received at the web application 500.

The machine learning functionality 506 can perform one or more of a transform (e.g., a 48-phase transform) of an electrical signal from a powered device, a de-noising against the electrical signal from the powered device, or a classification of the powered device based on the electrical signal. For example, the machine learning functionality 506 can be trained to identify powered devices based on the electrical signals received therefrom.

In another example, the machine learning functionality 506 may be used to identify usage patterns in the information collected or reported using the electrical usage monitoring functionality 502. For example, the rule generation functionality 504 can use the machine learning functionality to generate a rule for selectively controlling the delivery of electricity from one or more network-enabled electric plugs to one or more powered devices.

In yet another example, the machine learning functionality 506 may be used to process the information collected using the electrical usage monitoring functionality 502, such as to prepare that information for processing by the electrical usage monitoring functionality 502 and/or other functionality of the web application 500. For example, the machine learning functionality 506 can pre-process information collected from network-enabled electric plugs associated with the web application 500. Pre-processing the information using the machine learning functionality 506 can include de-noising or otherwise processing the information to modify it into a format which may be used by the electrical usage monitoring functionality 502.

The GUI 508 is a GUI which may be rendered or displayed, such as to render or display pages of the web application 500 for use. The GUI 508 can comprise part of a software GUI constituting data that reflect information ultimately destined for display on a hardware device, for example, the client 118 shown in FIG. 1). For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating the GUI -508 or another GUI on a display that can be used to generate pixel information. A structured data output of one device can be provided to an input of the hardware display so that the elements provided on the hardware display screen represent the underlying structure of the output data.

Implementations of the web application 500 may differ from what is shown and described with respect to FIG. 5. In some implementations, the web application 500 may include region definition functionality. For example, a user may use the region definition functionality to define one or more regions for which electrical usage may be configured, controlled, and monitored in connection with the web application 500. The region definition functionality may include default (e.g., out-of-the box) definitions for regions, user-configured definitions for regions, or both.

In some implementations, two or more of the aspects shown in FIG. 5 may be combined or omitted. For example, the machine learning functionality 506 may be combined into the rule generation functionality 504. In such an implementation, the machine learning functionality 506 may be limited to generating rules for selectively controlling the delivery of electricity from network-enabled electric plugs to powered devices.

In some implementations, the web application 500 can include device registration or authentication functionality. For example, the device registration or authentication functionality can include the earlier-described functionality related to identifying a device type or category of a powered device. In another example, the device registration or authentication functionality can include functionality for registering a network-enabled electric plug with the web application 500, such as to enable permissions for the web application 500 to be used to configure the network-enabled electric plug.

Figure 6:
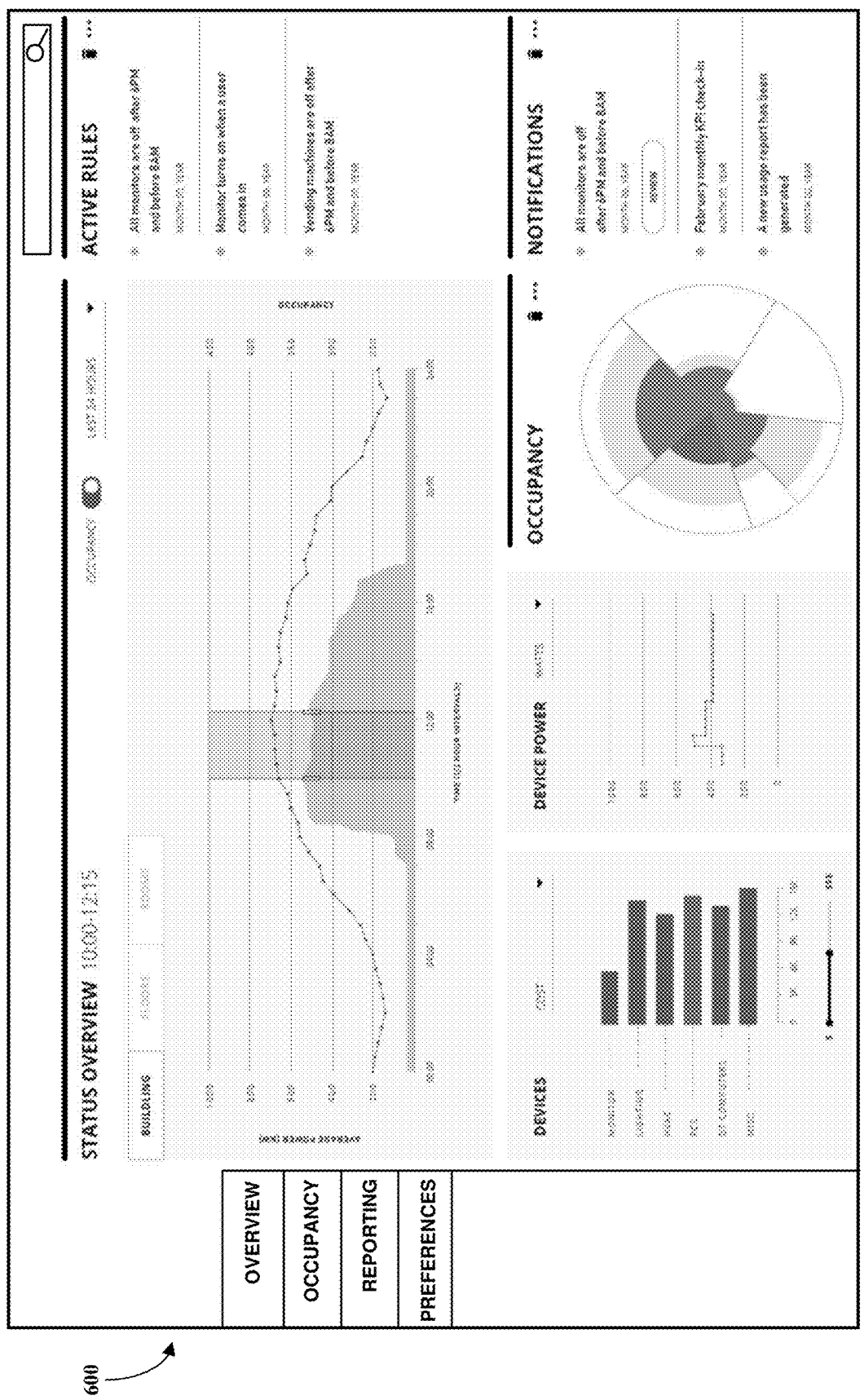
FIG. 6 is an illustration showing an example of a graphical user interface (GUI) of a web application of a region-based electrical intelligence system.

FIG. 6 is an illustration showing an example of a GUI 600 of a web application of a region-based electrical intelligence system. For example, the GUI 600 may be the GUI 508 of the web application 500 shown in FIG. 5. The GUI 600 shown in FIG. 6 may, for example, represent a GUI of a main dashboard page of the web application, which main dashboard page may be used by a user of the region-based electrical intelligence system 100 to configure, control, and/or monitor electrical usage within regions.

The GUI 600 includes a number of graphical data visualizations. For example, as shown, the GUI 600 includes a line graph showing average power consumption and occupancy over time. The line graph can be toggled to show the average power consumption and occupancy over time for an entire building or for certain regions of the building (e.g., for individual floors or individual rooms). In another example, as shown, the GUI 600 includes a bar graph showing aggregated costs based on electrical usage for device types (e.g., types or categories of powered devices). In yet another example, as shown, the GUI 600 includes a pie chart based on occupancy of one or more regions. Other graphs may be shown.

The GUI 600 also includes options for viewing, modifying, and/or deleting configurations of network-enabled electric plugs of the region-based electrical intelligence system. For example, as shown, the GUI 600 lists some active rules, which are rules generated by the web application and asserted against certain network-enabled electric plugs, such as to selectively control the delivery of electricity by those network-enabled electric plugs to respective connected powered devices.

The rules as shown in the GUI 600 include a first rule asserting that all monitors are to be powered off after 6 PM and before 8 AM each day, a second rule asserting that a monitor can be powered on when a user comes into a region (e.g., as an exception to the first rule), and a third rule asserting that all vending machines are to be powered off after 6 PM and before 8 AM each day. The GUI 600 may be limited to displaying a few rules on a main dashboard page. A different page of the GUI 600 may be used to view, modify, and/or delete all of the rules.

The GUI 600 also includes notifications displayed for a user to review. The notifications may represent changes, statuses, or other information relative to some or all of the network-enabled electric plugs, powered devices, and/or regions of the region-based electrical intelligence system. For example, as shown, the GUI 600 lists notifications indicating that all monitors are powered off for a certain region, the availability of monthly key performance indicators, and the availability of a new usage report.

The GUI 600 includes a frame, shown on the left side, at which selectable tabs are displayed. Each of the tabs, when selected, may cause a different page of the GUI 600 to be rendered or displayed. For example, as shown, the tabs in the frame of the GUI 600 include tabs for an overview page (e.g., the main dashboard page shown in FIG. 6), an occupancy page, a reporting page, and a preferences page. Other tabs may be shown.

Figure 7:
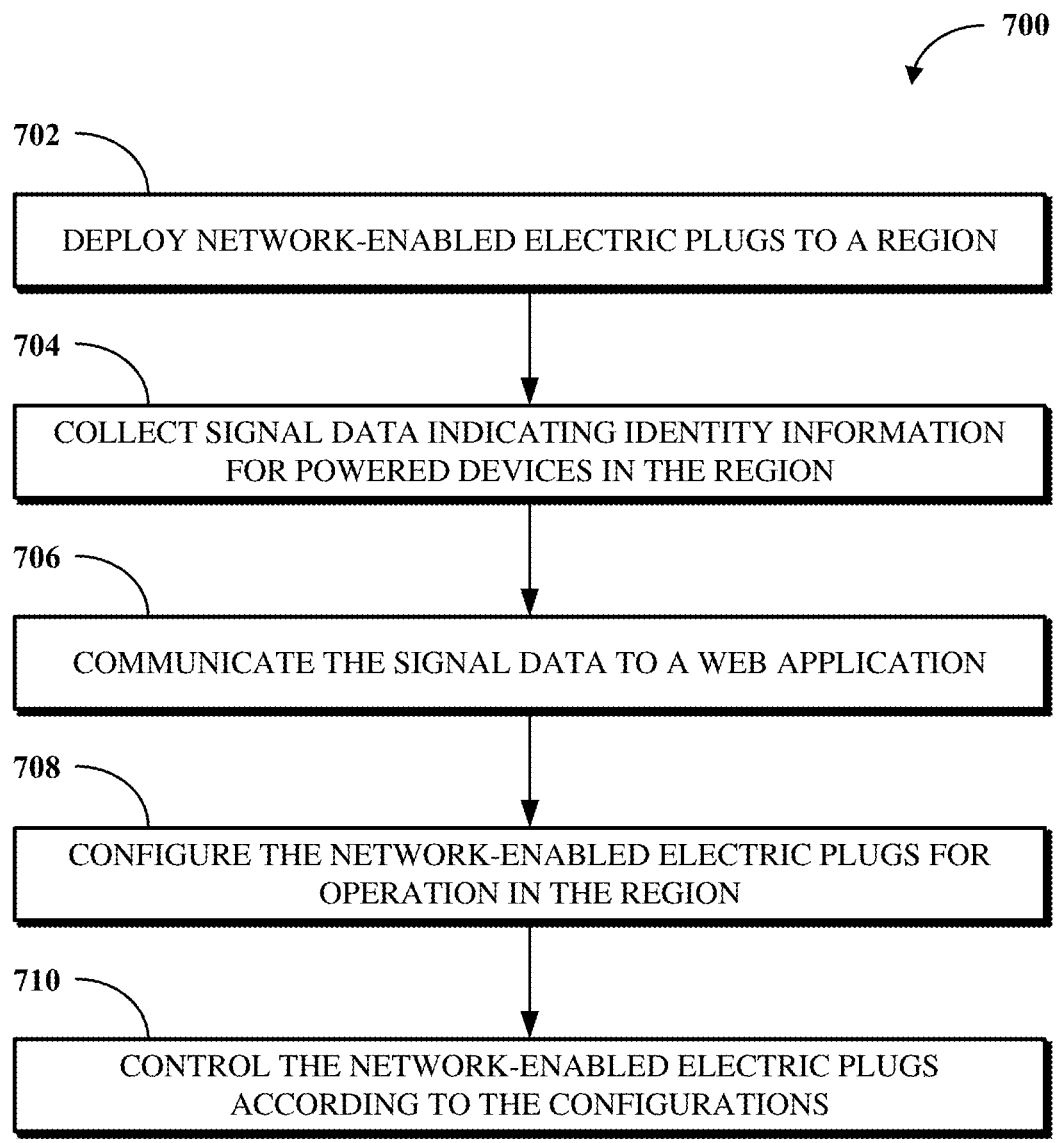
FIG. 7 is a flowchart showing an example of a technique for configuring and controlling network-enabled electric plugs of a region-based electrical intelligence system.
Figure 8:
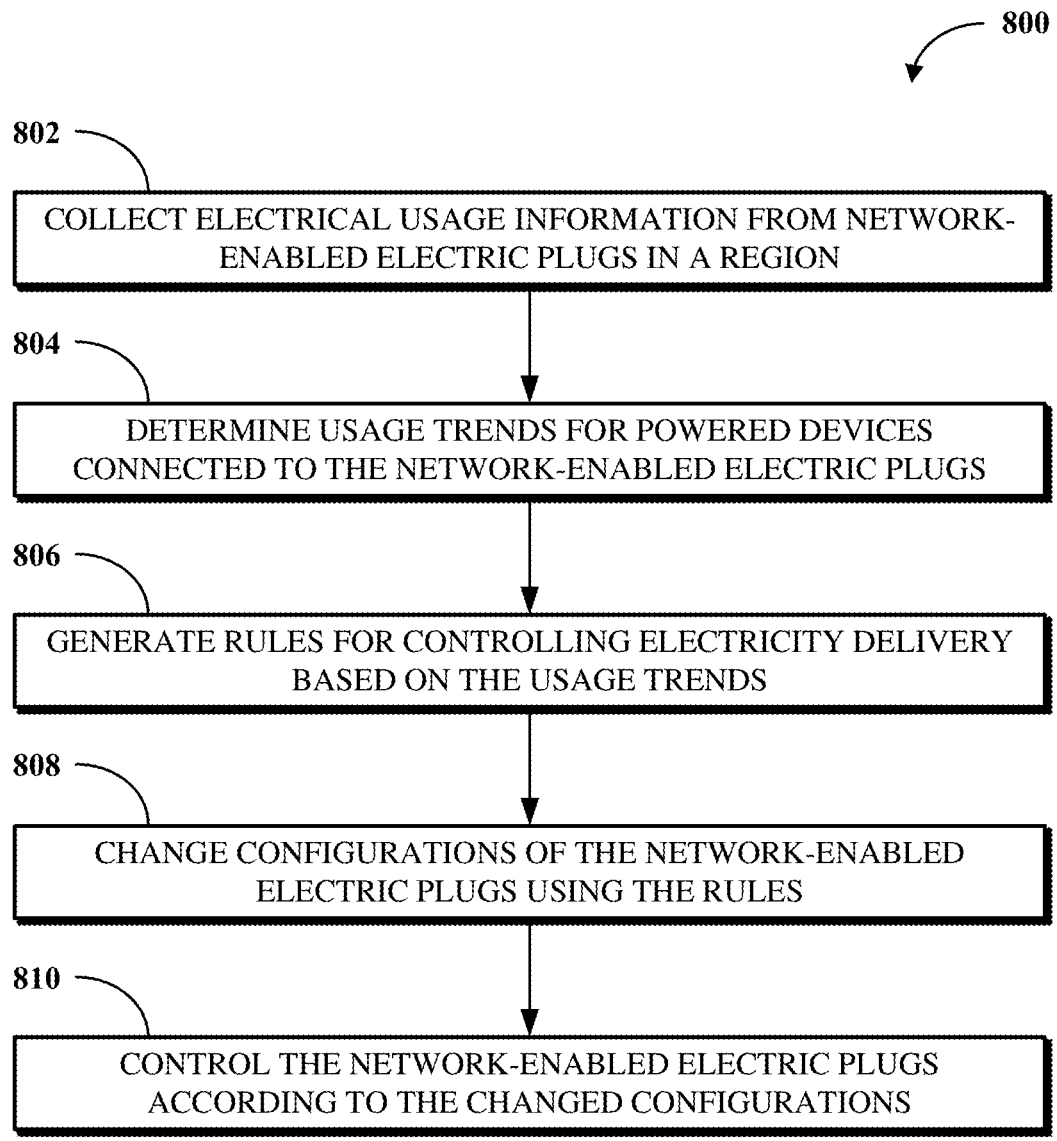
FIG. 8 is a flowchart showing an example of a technique for generating and asserting rules for controlling network-enabled electric plugs of a region-based electrical intelligence system.

To further describe some implementations in greater detail, reference is next made to examples of techniques which may be performed by or using a region-based electrical intelligence system as described with respect to FIGS. 1-6. FIG. 7 is a flowchart showing an example of a technique 700 for configuring and controlling network-enabled electric plugs of a region-based electrical intelligence system. FIG. 8 is a flowchart showing an example of a technique 800 for generating and asserting rules for controlling network-enabled electric plugs of a region-based electrical intelligence system.

The technique 700 and/or the technique 800 can be executed using computing devices, such as the systems, hardware, and software described with respect to FIGS. 1-6. The technique 700 and/or the technique 800 can be performed, for example, by executing a machine-readable program or other computer-executable instructions, such as routines, instructions, programs, or other code. The steps, or operations, of the technique 700 and/or the technique 800 or another technique, method, process, or algorithm described in connection with the implementations disclosed herein can be implemented directly in hardware, firmware, software executed by hardware, circuitry, or a combination thereof.

For simplicity of explanation, the technique 700 and the technique 800 are both depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for configuring and controlling network-enabled electric plugs of a region-based electrical intelligence system is shown. At 702, a number of network-enabled electric plugs are deployed to a region. Deploying the number of network-enabled electric plugs can include installing the network-enabled electric plugs within the region. Deploying the number of network-enabled electric plugs can also include connecting one or more powered devices to each of the network-enabled electric plugs installed within the region, such as by inserting one or more blades of the respective powered devices into sockets of respective network-enabled electric plugs.

At 704, signal data indicating identity information for powered devices in the region is collected. The signal data indicates identity information for the powered devices. The identity information for a powered device includes information which may be used to identify a device type of the powered device, to determine that the powered device is located in the region, or both. For example, the identity information for a powered device may include a frequency of an electric signal of the powered device, a pattern of electrical draw by the powered device, or both.

The signal data is collected using an access point associated with the region to which the network-enabled electric plugs are deployed. The access point can collect the signal data by pulling the signal data from the network-enabled electric plugs. For example, the access point can transmit requests for the signal data to ones of the network-enabled electric plugs and receive the signal data from those network-enabled electric plugs in response to the requests. Alternatively, the access point can collect the signal data by the network-enabled electric plugs pushing the signal data to the access point. For example, the access point can receive the signal data from ones of the network-enabled electric plugs without first transmitting a request therefor.

At 706, the signal data is communicated to a web application. The access point can transmit signal data received from the network-enabled electric plugs upon receiving the signal data from a network-enabled electric plug. Alternatively, the access point can wait until a certain number of signal datum are received or until signal data from a certain number of network-enabled electric plugs are received before transmitting the signal data to the web application. As a further alternative, the access point can be configured to transmit the signal data to the web application at a particular time or at particular time intervals.

At 708, the web application is used to configure the operation of the network-enabled electric plugs in the region. The web application uses the signal data received from the access point to configure the network-enabled electric plugs for operation in the region. Configuring the operation of the network-enabled electric plugs using the signal data includes processing the signal data for a powered device to infer a device type of the powered device.

In some cases, the device type of a powered device can be used to assert default rules for selectively controlling delivery of electricity from a network-enabled electric plug to that powered device. For example, the web application may access a database to determine a default rule to assert against that network-enabled electric plug based on the powered device. In other cases, the initial configurations for the network-enabled electric plug may be default configurations independent of a device type, such as where the web application determines that the powered device corresponding to a particular device type does not have particular usage requirements or patterns.

In some cases, such as where multiple powered devices are connected to a single network-enabled electric plug, the network-enabled electric plug may have been used to create signal data for individual ones of the multiple powered devices, such as where a sensor for detecting individual signals is located in or about sockets to which the ones of the multiple powered devices are connected.

Alternatively, the signal data can indicate that the signal data collected for the network-enabled electric plug represents a combination of signal data from multiple powered devices. The web application can process the combination of signal data to infer the device type of each of the multiple powered devices, for example, using signal processing to isolate frequencies within the combination of signal data.

At 710, the network-enabled electric plugs are controlled according to the configurations. Controlling the network-enabled electric plugs according to the configurations includes selectively controlling delivery of electricity from ones of the network-enabled electric plugs to respective ones of the powered devices based on those configurations.

In some implementations, the technique 700 includes collecting electrical usage information for the region from network-enabled electric plugs. For example, the electrical usage information for the region indicates the electrical usage of the powered devices based on the selectively controlled electricity delivery using the network-enabled electric plugs deployed to the region. The collected electrical usage information can be used to assess electrical usage for the region as a whole, rather than for the individual powered devices within the region.

In some implementations, the technique 700 includes changing configurations for at least some of the network-enabled electric plugs deployed within the region based on the collected electrical usage information. For example, the web application can generate rules for selectively controlling the delivery of the electricity from the network-enabled electric plugs to ones of the powered devices based on the electrical usage information. Implementations and examples for generating rules and changing configurations for network-enabled electric plugs based on the rules are described below with respect to FIG. 8.

In some implementations, the technique 700 includes detecting a relocation of a network-enabled electric plug, such as from a first region to a second region. For example, a network-enabled electric plug can detect that it has moved from the first region to a second region by obtaining identifiers for each of a set of network-enabled electric plugs located in the second region and determining that the obtained identifiers do not correspond to a list of previously obtained identifiers for the first region. The identifiers may, for example, be IP addresses of the network-enabled electric plugs.

For example, when the network-enabled electric plug is plugged into an electrical source in the second region, it connects to the web application (e.g., through the access point or directly) for authorization. During the authorization process (whether this is the first or a subsequent authorization), the network-enabled electric plug sniffs for other network-enabled electric plugs connected to a common access point. The network-enabled electric plug can obtain IP addresses for each of the network-enabled electric plugs it identified by the sniffing.

If the IP addresses do not match a previously known list of IP addresses (e.g., the IP addresses of the network-enabled electric plugs previously sniffed during a previous authorization process), the network-enabled electric plug can determine that it has been relocated. The network-enabled electric plug can transmit a message to the web application indicating the relocation. Alternatively, a user of the web application can manually indicate the relocation within the web application.

In some cases, the frequency of an electrical signal of a network-enabled electric plug may be increase or decrease from a typical frequency of the electrical signal when the network-enabled electric plug is involved in an authorization process with the web application. For example, a network-enabled electric plug may typically have an electrical signal with a low frequency (e.g., one hertz or less). However, during authorization, the network-enabled electric plug may have an electrical signal with a higher frequency (e.g., one kilohertz or more) for some amount of time (e.g., one second or less).

In some implementations, the access point may be omitted. In such an implementation, the technique 700 may include the network-enabled electric plugs collecting the respective signal data and communicating the signal data directly to the web application.

Referring next to FIG. 8, the technique 800 for generating and asserting rules for controlling network-enabled electric plugs of a region-based electrical intelligence system is shown. At 802, electrical usage information is collected from network-enabled electric plugs in a region. The electrical usage information can indicate amounts of electricity delivered to one or more powered devices connected to each of the network-enabled electric plugs. For example, a web application of a system for region-based electrical intelligence can collect the electrical usage information from the network-enabled electric plugs.

At 804, usage patterns for powered devices connected to the network-enabled electric plugs are determined. The usage patterns can be determined by processing the electrical usage information for the powered devices. For example, the web application can include functionality (e.g., machine learning functionality) for processing the electrical usage information to determine the usage patterns. For example, the electrical usage information for a powered device can indicate an activity cycle of the powered device. The activity cycle can be used to verify the device type of the powered device. The activity cycle can also or instead be used to determine when and how the powered device receives electricity.

At 806, rules for collecting the delivery of electricity to the powered devices using respective network-enabled electric plugs are generated. The rules are used for selectively controlling the delivery of electricity from the network-enabled electric plugs of the region to the powered devices connected to those network-enabled electric plugs. The rules are generated by the web application.

For example, the web application can generate the rules by using machine learning functionality to analyze the usage patterns for the powered devices and define the rules based on predictive demand for those powered devices. In such a case, the web application may present the generated rules to a user of the web application for approval. In another example, the web application can generate the rules by presenting the usage patterns to the user of the web application. The user of the web application may then manually define the rules based on the usage patterns.

At 808, the configurations of the network-enabled electric plugs are changed according to the rules. Changing the configuration of a network-enabled electric plug includes asserting a rule generated by the web application against the network-enabled electric plug. The changed configuration represents a change to the manner in which the network-enabled electric plug is used to selectively deliver electricity to the one or more powered devices that are connected to the network-enabled electric plug. At 810, the network-enabled electric plugs are controlled according to the changed configurations.

Figure 9:
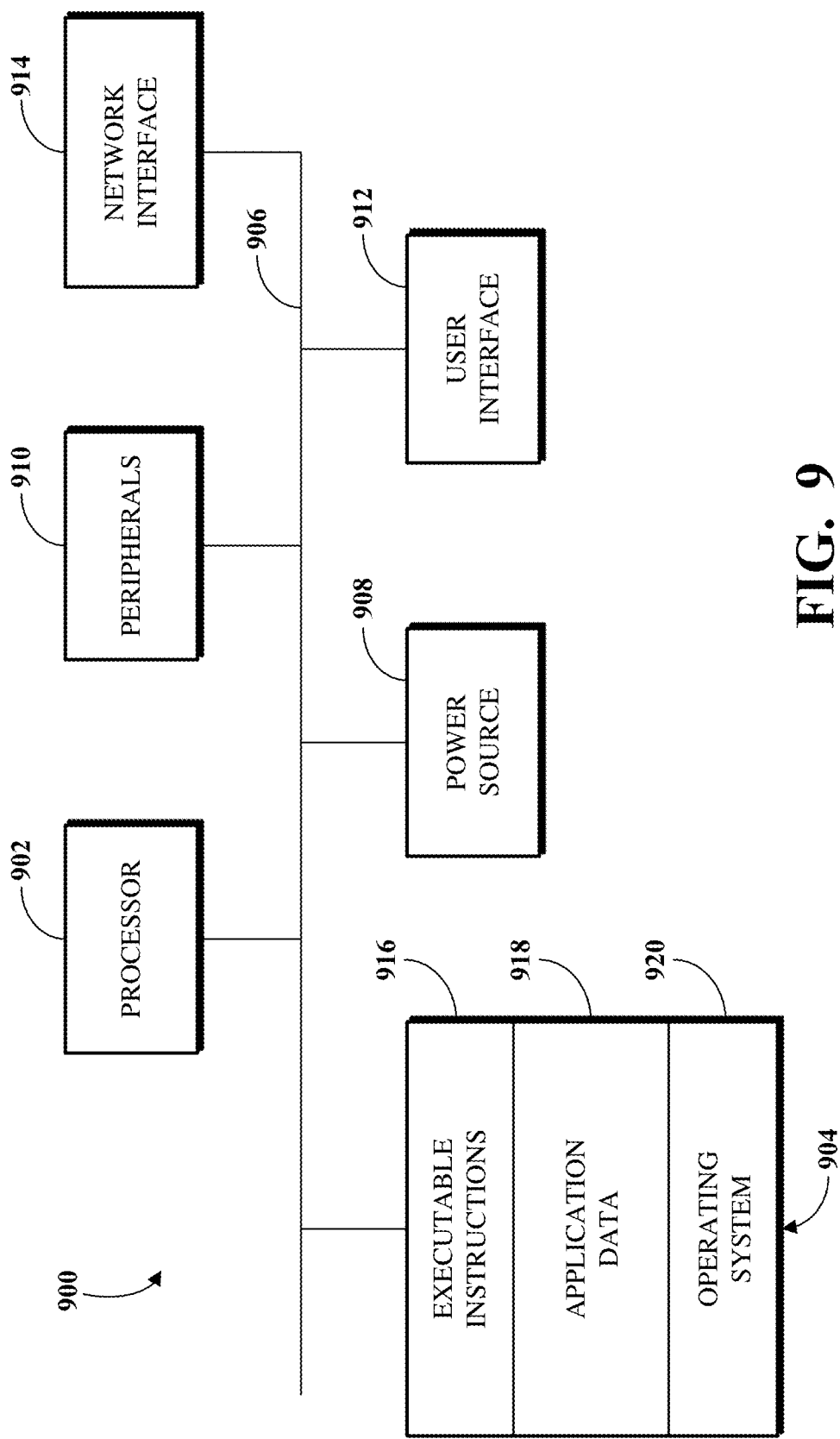
FIG. 9 is a block diagram showing an example of a computing device which may be used in a region-based electrical intelligence system.

FIG. 9 is a block diagram showing an example of a computing device 900 which may be used in a region-based electrical intelligence system, for example, the region-based electrical intelligence system 100 shown in FIG. 1. The computing device 900 may be used to implement a server on which a web application is run (e.g., the server 106 and the web application 108 shown in FIG. 1). Alternatively, the computing device 900 may be used to implement a client that accesses the web application (e.g., the client 118 shown in FIG. 1). As a further alternative, the computing device 900 may be used as or to implement another client, server, or other device according to the implementations disclosed herein.

The computing device 900 includes components or units, such as a processor 902, a memory 904, a bus 906, a power source 908, peripherals 910, a user interface 912, and a network interface 914. One of more of the memory 904, the power source 908, the peripherals 910, the user interface 912, or the network interface 914 can communicate with the processor 902 via the bus 906.

The processor 902 is a central processing unit, such as a microprocessor, and can include single or multiple processors having single or multiple processing cores. Alternatively, the processor 902 can include another type of device, or multiple devices, now existing or hereafter developed, configured for manipulating or processing information. For example, the processor 902 can include multiple processors interconnected in any manner, including hardwired or networked, including wirelessly networked. For example, the operations of the processor 902 can be distributed across multiple devices or units that can be coupled directly or across a local area or other suitable type of network. The processor 902 can include a cache, or cache memory, for local storage of operating data or instructions.

The memory 904 includes one or more memory components, which may each be volatile memory or non-volatile memory. For example, the volatile memory of the memory 904 can be random access memory (RAM) (e.g., a DRAM module, such as DDR SDRAM) or another form of volatile memory. In another example, the non-volatile memory of the memory 904 can be a disk drive, a solid state drive, flash memory, phase-change memory, or another form of non-volatile memory configured for persistent electronic information storage. The memory 904 may also include other types of devices, now existing or hereafter developed, configured for storing data or instructions for processing by the processor 902.

The memory 904 can include data for immediate access by the processor 902. For example, the memory 904 can include executable instructions 916, application data 918, and an operating system 920. The executable instructions 916 can include one or more application programs, which can be loaded or copied, in whole or in part, from non-volatile memory to volatile memory to be executed by the processor 902. For example, the executable instructions 916 can include instructions for performing some or all of the techniques of this disclosure. The application data 918 can include user data, database data (e.g., database catalogs or dictionaries), or the like. The operating system 920 can be, for example, Microsoft Windows®, Mac OS X®, or Linux®; an operating system for a small device, such as a smartphone or tablet device; or an operating system for a large device, such as a mainframe computer.

The power source 908 includes a source for providing power to the computing device 900. For example, the power source 908 can be an interface to an external power distribution system. In another example, the power source 908 can be a battery, such as where the computing device 900 is a mobile device or is otherwise configured to operate independently of an external power distribution system.

The peripherals 910 includes one or more sensors, detectors, or other devices configured for monitoring the computing device 900 or the environment around the computing device 900. For example, the peripherals 910 can include a geolocation component, such as a global positioning system location unit. In another example, the peripherals can include a temperature sensor for measuring temperatures of components of the computing device 900, such as the processor 902.

The user interface 912 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 914 provides a connection or link to a network (e.g., the network 116 shown in FIG. 1). The network interface 914 can be a wired network interface or a wireless network interface. The computing device 900 can communicate with other devices via the network interface 914 using one or more network protocols, such as using Ethernet, TCP, IP, power line communication, Wi-Fi, Bluetooth, infrared, GPRS, GSM, CDMA, Z-Wave, ZigBee, another protocol, or a combination thereof.

Implementations of the computing device 900 may differ from what is shown and described with respect to FIG. 9. In some implementations, the computing device 900 can omit the peripherals 910. In some implementations, the memory 904 can be distributed across multiple devices. For example, the memory 904 can include network-based memory or memory in multiple clients or servers performing the operations of those multiple devices. In some implementations, the application data 918 can include functional programs, such as a web browser, a web server, a database server, another program, or a combination thereof.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc.

Likewise, the terms "system" or "mechanism" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system, comprising:
   a server that includes a web application, wherein the web application is configured to detect a relocation of a network-enabled electric plug of network-enabled electric plugs from a first region to a second region based on a determination that IP addresses obtained via network sniffing do not correspond to a previously known list of IP addresses;

the network-enabled electric plugs, each network-enable electric plug configured to deliver electricity from an electrical source to a powered device and configured to communicate with the server; and an access point intermediary that enables communication between the network-enabled electric plugs and the server.

2. The system of claim 1, wherein the web application is further configured to change configurations of the network-enabled electric plug to control electrical usage in the second region.

3. The system of claim 1, wherein the network-enabled electric plug comprises an input for receiving electricity from the electrical source and an output for delivering electricity to the powered device, and wherein the input and the output include hardware and software components enabling a delivery of electricity by the network-enabled electric plug.

4. The system of claim 1, wherein the network-enabled electric plug comprises a control module configured to assert rules for electricity delivery based on data received from the web application.

5. The system of claim 1, wherein the network-enabled electric plug comprises a monitor module that obtains, from sensors of the network-enabled electric plug, monitored data of the electricity delivered from an input of the network-enabled electric plug to an output of the network-enabled electric plug, and wherein the monitor module communicates the monitored data to the web application.

6. The system of claim 1, wherein the web application includes a graphical user interface configured to display data visualizations representing electrical usage patterns and to enable management and configuration of the network-enabled electric plugs.

7. The system of claim 1, wherein the web application includes machine learning functionality that analyzes electrical usage data to identify powered devices and respective usage patterns, and generate rules for controlling electricity delivery to at least some of the powered devices.

8. The system of claim 1, wherein the network-enabled electric plug includes a physical interface element that enables users to interact with the network-enabled electric plug to override configured rules for some amount of time, enabling unimpeded flow of electricity from the network-enabled electric plug to a powered device connected to the network-enabled electric plug for a specified amount of time.

9. The system of claim 1, wherein the network-enabled electric plug is configured to allow simultaneous direct delivery of electricity to multiple powered devices.

10. The system of claim 1, wherein the web application is configured to enable users to view and analyze electrical usage data at various stages including building, floor, room, and individual powered devices.

11. The system of claim 1, wherein the web application includes rule generation functionality that enables a generation of rules based on an analysis of electrical usage data, and wherein the rules are available for user review and approval before implementation.

12. The system of claim 1, wherein the system is configured to change configurations of at least some of the network-enabled electric plugs based on collected electrical usage data.

13. A method, comprising:
connecting a network-enabled electric plug to a web application for authorization;
initiating a sniffing process during an authorization process to identify other network-enabled electric plugs connected to a common access point and obtaining identifiers for each identified network-enabled electric plug;
identifying a relocation of the network-enabled electric plug from a first region to a second region based on a determination that identifiers obtained during the sniffing process do not match a previously known list of identifiers;
transmitting a message to the web application to indicate the relocation; and
receiving, from the web application, configurations for configuring the network-enabled electric plug that control electrical usage in the second region.

14. The method of claim 13, wherein a frequency of an electrical signal of the network-enabled electric plug during the authorization process is different, for a specified amount of time, from a typical frequency to enable the authorization process.

15. The method of claim 14, wherein the typical frequency of the electrical signal is one hertz or less, and the frequency during the authorization process increases to one kilohertz or more.

16. The method of claim 15, wherein the specified amount of time is one second or less.

17. The method of claim 13, wherein the identifiers comprise respective IP addresses of the other network-enabled electric plugs.

18. A network-enabled electric plug, comprising:
a processor configured to:
connect the network-enabled electric plug to a web application for authorization;
initiate a sniffing process during an authorization process to identify other network-enabled electric plugs connected to a common access point and obtaining IP addresses for each identified network-enabled electric plug;
identify a relocation of the network-enabled electric plug from a first region to a second region based on a determination that identifiers obtained during the sniffing process do not match a previously known list of identifiers; and
receive, from the web application, configurations for configuring the network-enabled electric plug that control electrical usage in the second region.

19. The network-enabled electric plug of claim 18, wherein a frequency of an electrical signal of the network-enabled electric plug during the authorization process is different, for a specified amount of time, from a typical frequency to enable the authorization process.

20. The network-enabled electric plug of claim 19, wherein the typical frequency of the electrical signal is one hertz or less, and the frequency during the authorization process increases to one kilohertz or more, wherein the specified amount of time is one second or less.

* * * * *